Sept. 26, 1961 R. G. DIQUATTRO 3,001,377
METHOD OF COOLING HOT METALLIC PARTS
Filed June 10, 1958
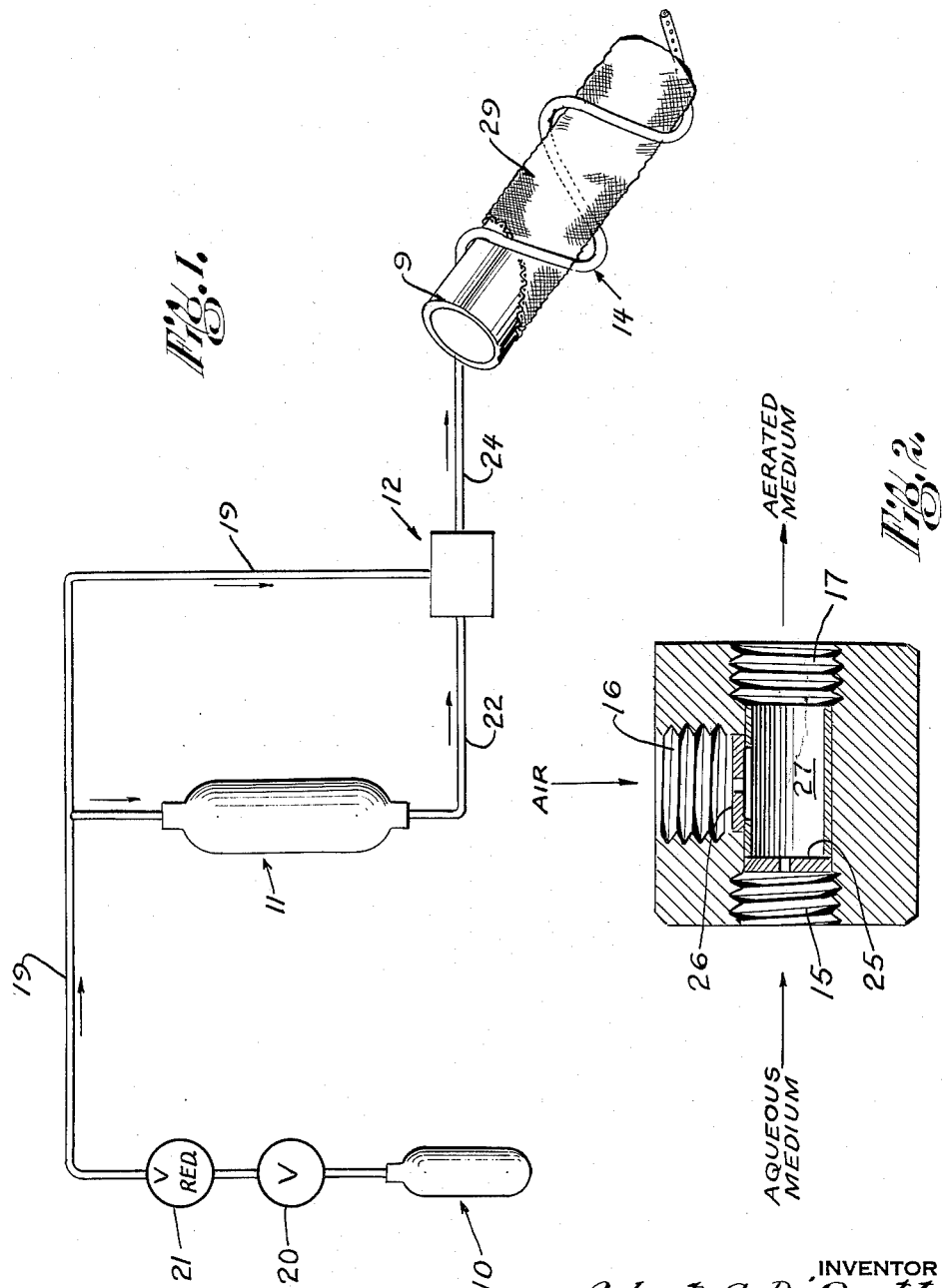
INVENTOR
Robert G. Di Quattro
BY
J. William Carson
ATTORNEY

United States Patent Office 3,001,377
Patented Sept. 26, 1961

3,001,377
METHOD OF COOLING HOT METALLIC PARTS
Robert G. Diquattro, Elizabeth, N.J., assignor to Specialties Development Corporation, Belleville, N.J., a corporation of New Jersey
Filed June 10, 1958, Ser. No. 741,197
1 Claim. (Cl. 62—64)

The present invention relates to fire prevention, and, more particularly, to a method of cooling hot metallic parts to a temperature whereby such parts will not ignite inflammable fluids.

The present invention is primarily concerned with minimizing fire hazards heretofore experienced in connection with fast moving craft or vehicles, such as aircraft, speed boats and the like which are propelled by highly inflammable fuel or carry inflammable fluids for other purposes. For example, the exhaust manifold and other machinery parts of aircraft power plants become extremely hot in the normal operation thereof, whereupon, in the event of collision or crash when inflammable materials are released from receptacles normally confining the same and contact hot metallic parts, such materials are ignited and burst into flame. The resulting crash fires are almost impossible to control and in practically all cases severely damage or destroy the craft or vehicle and critically or fatally injure the occupants thereof.

Heretofore, it has been proposed to prevent such fires by cooling the hot parts the instant crash or collision takes place, for example by directing a cooling substance on the hot parts before the inflammable materials can come in contact therewith. For such purpose, it has been proposed to utilize water in mist or spray form. Water mist or fog, as sometime called is practically ineffective because sufficient quantities thereof cannot be directed on the hot parts in the split second time period between crash and spillage. Sprays of water are undesirable because they cannot be utilized without either excessive loss of coolant, owing to spillage, or because they require cumbersome and complicated distribution and discharge means to effect adequate coverage of the area.

Accordingly, an object of the present invention is to eliminate the foregoing difficulties and disadvantages by providing a more rapid and effective coolant adapted to be directed on hot parts to cool the same with complete assurance that highly inflammable materials subsequently coming in contact therewith will not be ignited thereby.

Another object is to provide a simple, practical and reliable method of producing such coolants and directing the same on hot parts.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been discovered that hot metallic parts can be cooled extremely rapidly by directing sprays of aqueous medium thereon having a quantity of gas admixed therein. This can be accomplished by admixing a non-combustible gas under pressure and the aqueous medium, for example, by introducing the gas under pressure into a flowing stream of the aqueous medium, and immediately directing the mixture on the hot parts.

In furtherance of the invention, such gases may be air, nitrogen, carbon dioxide, and/or any of the many known halogenated hydrocarbon compounds which are non-flammable and are adapted to exist as gases under pressure at temperatures in the neighborhood of about −65° F. Other gases, such as argon, helium, krypton and neon, may be employed, but their present cost makes them impractical from an economical viewpoint. The use of air is preferred because it can be obtained without direct cost in unlimited quantities from the atmosphere and can be suitably compressed and stored by conventional compressor systems installed on craft and vehicles.

The aqueous medium may be water or water solutions containing salts in varying quantities having good cooling and anti-freeze properties. Such salt solutions are well known in the fire extinguishing art, and examples thereof need not be given. Such solutions may contain sufficient salts to adjust the specific gravity thereof to about 1.5. A specific aqueous solution adapted to have air admixed therein in accordance with this invention is described in United States Patent No. 2,745,806.

Numerous experiments have indicated that optimum cooling effects can be attained by admixing about two and one half gallons of aqueous medium with about one and one quarter pounds of gas. On a weight basis, one part of air may be admixed with about seventeen and one half parts water or about twenty-six parts salt solution having a specific gravity of about 1.5. The admixture of such relatively large quantities of gas in aqueous liquids increases the cooling effectiveness of such liquids from about 50% to about 75%.

It is believed that such increases in cooling effectiveness is due in part to the dispersing or spreading effect of the aqueous liquid caused by the admixed expanding air as it outgases from the liquid, whereby the same is applied uniformly over the surface area of the hot part, rather than locally, and in part to the refrigerating effect produced by compressed gas being expanded from a pressure on the order of 100 or 300 p.s.i. to atmospheric pressure, this phenomenon being known as the Joule-Thomson effect. The cooled air extracts heat from the liquid which heat is carried away by the expanded air, conditions the liquid to enable the same to remove more heat from the hot parts, and also extracts heat directly from the hot parts.

In practicing the invention, it was found that about thirty-one pounds of an aqueous salt solution, in accordance with the aforementioned patent, at −40° F. admixed with about one and one quarter pounds of air at −40° F. having an initial pressure of about 300 p.s.i., when applied immediately for a period of thirty seconds over a surface area of about 72 square feet of a mass of ferrous metal, weighing 183 pounds and heated to 1200° F., reduced the temperature of the metal to about 600° F., whereupon aviation type gasoline coming in contact with the mass, after application of the aqueous salt solution mixed with air had commenced, did not ignite.

Other tests under similar conditions indicated that the aqueous salt solution admixed with air having an initial pressure of about 100 p.s.i. was much less effective to cool the mass of metal, whereupon aviation type gasoline coming in contact with the mass was able to ignite. It was also noted that the aqueous solution did not disperse or spread as well as the aqueous solution admixed with air at the higher pressure, and acted somewhat like a spray of aqueous medium which had not been admixed with air.

By the term admix as used herein is meant to physically mix drops of an aqueous medium with bubbles of gas under at least several atmospheres of pressure to provide an aqueous medium containing a relatively large amount of gas under pressure, for example, between about 3% and about 6% by weight, depending on the specific gravity of a given volume of liquid. This term is not intended to include water fog or mist produced by discharging minute droplets of water into atmospheric air, nor is this term intended to include atmospheric air which has been entrained by a stream of water under pressure.

By extremely hot metallic parts is meant parts having a temperature sufficiently high to cause gasoline or other inflammable fluids to be ignited when coming in contact therewith in the presence of a combustion supporting atmosphere.

In the drawing:

FIG. 1 is a schematic view of a system for carrying out the method in accordance with the present invention.

FIG. 2 is a sectional view of the mixing chamber on an enlarged scale.

Referring in detail to FIG. 1, a system is shown for rapidly cooling a hot exhaust stack 9 constructed of ferrous metal, by way of example. This system essentially comprises a 178 cubic inch receptacle 10 for storing about 1.55 pounds of air at 3000 p.s.i., a two and one half gallon container 11 for storing about thirty one pounds of an aqueous salt solution having a specific gravity of about 1.5, a mixing chamber 12 wherein a flowing stream of the solution is adapted to be admixed with the air, and a spray pipe 14 which is apertured for immediately directing the air containing solution onto the stack.

The receptacle 10 has an outlet, the container 11 has an inlet at its upper end and an outlet at its lower end, and the mixing chamber (FIG. 2) has an inlet 15 for the aqueous solution, an inlet 16 for the compressed air and an outlet 17 for the air containing solution.

Conduit means 19 are connected for establishing fluid flow communication between the outlet of the receptacle 10 and the inlet of the container 11 and the inlet 16 of the mixing chamber. A remotely operable air release valve 20 under the control of crash responsive apparatus and a constant pressure regulating and reducing valve 21 for adjusting the pressure of the air to about 300 p.s.i. are connected in the conduit means upstream of the container inlet and the mixing chamber inlet 16. Conduit means 22 connect the container outlet and the mixing chamber inlet 15, and conduit means 24 connect the spray pipe 4 and the mixing chamber outlet 17.

As shown in FIG. 2, the mixing chamber inlets 15 and 16 are provided with orifice means 25 and 26 dimensioned for respectively metering the aqueous solution and the compressed air at a predetermined rate. For example, the orifice means are so dimensioned that about one and one quarter pounds of air initially at about 300 p.s.i. are injected into and admixed with about thirty one pounds of aqueous solution in about twenty five to thirty seconds, complete discharge of the air and the solution being substantially simultaneous. Such injection and admixture are accomplished while both the air and the solution pass through a chamber 27 as flowing streams.

It has further been discovered that sprays of water or aqueous salt solutions admixed with a large quantity of high pressure air diffuse through a metallic spillage prevention or flow inhibiting screen or sieve 29 closely surrounding the stack 9 much better than streams which have not been so admixed with air, whereby the aqueous medium is spread uniformly on the surface of the stack throughout its entire area when applied thereto.

From the foregoing description, it will be seen that the present invention provides an improved method of rapidly cooling hot metallic parts in a simple, practical and reliable manner.

While the invention has been described in connection with an exhaust stack, it is apparent that the same may be practiced in the cooling of hot parts where similar problems exist.

As various changes may be made without departing from the spirit and scope of the invention and without sacrificing any of its advantages, it is to be understood that all matter herein is to be interpreted as illustrative and not in any limiting sense.

This application is a continuation-in-part application of application for United States Letters Patent, Serial No. 523,031, filed July 19, 1955 now abandoned.

I claim:

The method of cooling an extremely hot metallic part of aircraft to prevent a fire when an inflammable fluid comes in contact with the part, which method comprises pressurizing and propelling an aqueous medium witth a gas under pressure to produce a flowing stream of aqueous medium, the aqueous medium having a salt dissolved therein to maintain the same in liquid state at high altitude temperatures, injecting betwen about 3 and about 6 parts by weight of non-flammable gas into the flowing stream of about one hundred parts by weight of the aqueous medium, the gas being injected at a rate of between about 1.0 and about 1.25 pounds in about 25 to 30 seconds and the gas being at a pressure of about 300 p.s.i. to thereby admix the aqueous medium with a relatively large amount of gas, the flow of the gas and the flowing stream of aqueous medium being metered to proportion the gas and aqueous medium to attain the desired admixture, and immediately spraying a stream of the mixture of gas and aqueous medium through a screen on the hot metallic part, the mixture of gas and aqueous medium being characterized in that the gas breaks up the stream and spreads the aqueous medium as it contacts the hot metallic part, that the aqueous medium readily diffuses through the screen, that the gas expands and is cooled and thereby extracts heat from the aqueous medium to condition the aqueous medium to remove more heat from the hot metallic part and that the gas also extracts heat directly from the hot metallic part, whereby the cooling effectiveness of the aqueous medium is increased from about 50% to 75%, the amounts of gas and aqueous medium available and the flow rates thereof being such that the flow of gas and the flow of aqueous medium terminate almost simultaneously.

References Cited in the file of this patent

UNITED STATES PATENTS

| | | |
|---|---|---|
| 1,161,319 | Kramer | Nov. 23, 1915 |
| 1,431,789 | Hamilton | Oct. 10, 1922 |
| 1,511,722 | Dickerman | Oct. 14, 1924 |
| 1,771,151 | Treichel | July 22, 1930 |
| 2,364,130 | Clancy | Dec. 5, 1944 |
| 2,577,024 | Lundberg | Dec. 9, 1951 |
| 2,615,686 | Davidson | Oct. 23, 1952 |
| 2,721,729 | Van Riper | Oct. 25, 1955 |
| 2,741,317 | Tibbets | Apr. 10, 1956 |
| 2,745,806 | Anthony | May 15, 1956 |
| 2,745,807 | Anthony | May 15, 1956 |
| 2,769,500 | Clifford | Nov. 6, 1956 |

FOREIGN PATENTS

| | | |
|---|---|---|
| 19,566 | Switzerland | of 1899 |
| 8,322 | Great Britain | of 1898 |